Patented Aug. 2, 1949

2,477,937

UNITED STATES PATENT OFFICE 2,477,937

N-HYDROCARBON 3-PIPERIDINOLS

Raymond Paul and Gustave Jean Roy, Versailles, France, assignors to Societe Des Usines Chimiques Rhone-Poulenc, Paris, France, a French body corporate No Drawing. Application July 2, 1946, Serial No. 681,140. In France January 13, 1945

Section 1, Public Law 690, August 8, 1946
Patent expires January 13, 1965

4 Claims. (Cl. 260—293)

This invention relates to new cyclic amino alcohols; more specifically it concerns new piperidino alcohols of value as starting materials for the manufacture of new pharmaceutical and industrial products. This invention also relates to processes for the manufacture of these new compounds from readily available products in a novel and unexpected manner.

The new cyclic amino alcohols of the present invention are 3-hydroxy-piperidines substituted on the ring nitrogen atom by a radical selected from the class consisting of alkyl, aralkyl and aryl groups. In general, therefore, they conform to the general formula:

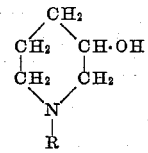

wherein R represents a radical selected from the class consisting of alkyl, aralkyl and aryl groups. The radical R may represent any alkyl group—specific representative examples are methyl, ethyl, propyl, pentyl and butyl groups, or any aralkyl groups—specific representative examples are benzyl and phenylethyl groups, or any aryl groups—specific representative examples are phenyl and naphthyl groups.

According to a feature of the present invention, these new cyclic amino alcohols can be obtained in a simple and convenient manner from products of the hydrogenation of furfural by a series of reactions in respect of which it was impossible to predict a priori whether they would lead to derivatives of tetrahydrofurane or to derivatives of piperidine. These reactions give rise to the required N-alkyl, N-aralkyl- and N-aryl-3-hydroxy-piperidines in excellent yields and thus make these new products very readily accessible.

Thus, in accordance with the invention, compounds of the foregoing general formula are obtained either by opening by means of a hydrogen halide the epoxy ring of an N-di-substituted tetrahydrofurfurylamine (readily obtainable starting from tetrahydrofurfuryl alcohol) and cyclising the halogenated amino alcohol thus formed or by reacting a 1,5-dihalogeno-pentanol-2 or a 1-halogeno -4, 5-epoxy pentane (both obtainable starting from tetrahydrofurfuryl alcohol) with an amine.

The amines reacted with the dihalogenopentanol (or the halogenoepoxypentane) are in general primary amines. However, secondary amines in which at least one of the substituents is of the form:

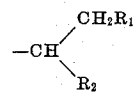

can also be used; in this case, a quaternary ammonium compound is formed intermediately during the cyclising process, this compound being decomposed with formation of an olefine of the form: $R_1$—CH=CHR$_2$, $R_1$ and $R_2$ being hydrogen or hydrocarbon radicals. Where the N-disubstituted tetrahydrofurfurylamine is employed, one of the substituents is R of the foregoing general formula while the other has the form

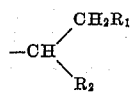

the presence of which gives rise to the formation of a quaternary ammonium compound on treatment with hydrogen halide which is decomposed to give the required product.

The following schemes illustrate the invention in the form hereinbefore mentioned.

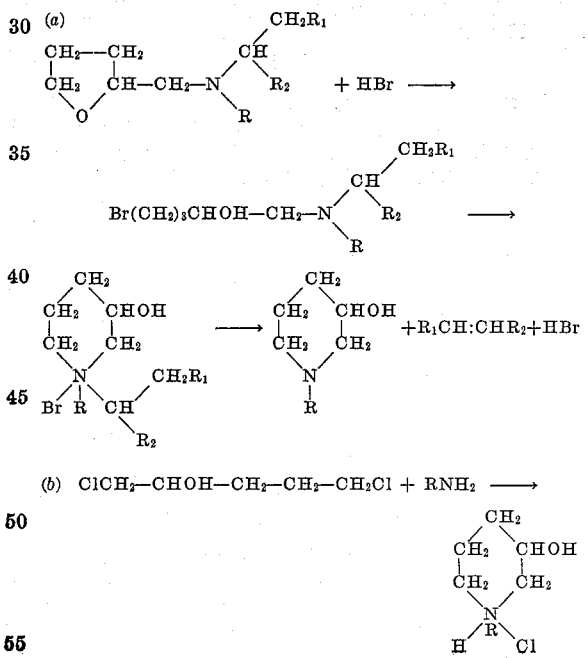

(c) $CH_2-CH-CH_2-CH_2-CH_2Cl + RNH_2 \longrightarrow$ 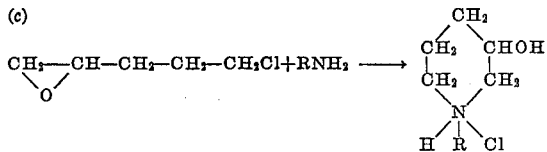

Without in any way limiting the invention, the following examples show how it may be put into actual practice:

Example I

In a solution of 16 g. of N:N-diethyl-tetrahydrofurylamine in 8 g. of acetic acid are absorbed 17 g. HBr, after which the solution is heated to about 100° C. for 3 hours. It is taken up in water and cooled, and concentrated ammonia is added drop-wise. A thick oil is precipitated which solidifies. The solid mass is dissolved in water and the solution saturated using solid potash. A small amount of ammonia is thereby liberated. On boiling, gaseous ethylene is evolved and at the same time a liquid separates. By rectification of this liquid, after drying it over potash, there are obtained 9.6 g. of 1-ethyl-3-hydroxy-piperidine, boiling at 95° C./13 mm. This hydroxy piperidine gives on treatment with benzoyl chloride the hydrochloride of 3-benzoyloxy-1-ethyl-piperidine which melts at 204–5° C.

The N:N-diethyl-tetrahydrofurylamine is prepared by warming 20 g. of tetrahydrofurfuryl chloride with 44 g. of diethylamine in a sealed tube at 150° C. for 40 hours. The reaction is accelerated by the addition of 2 g. of sodium iodide.

Example II

A mixture of 10 g. of 1-chloro-4:5-epoxy-pentane and 4.5 g. of mono-ethylamine are heated at 100° C. for 4 hours in a sealed tube. The reaction mixture is then taken up in caustic soda solution and the product isolated is the same as in Example I.

The 1-chloro-4:5-epoxy-pentane is obtained in good yield by the action of potash on 1:5 dichloro-pentanol-2.

Example III

On warming a molecular proportion of aniline with one of 1-chloro-4:5-epoxy-pentane, there is formed 1-phenyl-3-hydroxy-piperidine, boiling at 176°/16 mm.

Example IV 31 g. of 1:5-dichloro-pentanol-2 are heated with 29 g. of diethylamine at 100° C. for 4 hours. The reaction mass is dissolved in water and the solution saturated with potash and raised to boiling point until evolution of ethylene ceases. From the insoluble layer which separates, 8.5 g. of 1-ethyl-3-hydroxy-piperidine are isolated.

The 1:5-dichloro-pentanol-2 is obtained by the action of gaseous hydrogen chloride on tetrahydrofurfuryl alcohol heated to 90°–100° C. in the presence of a small amount of acetic acid.

We claim:
1. Cyclic amino alcohols of the general formula:

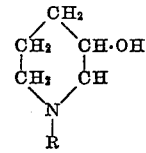

wherein R represents a member of the group consisting of alkyl, phenylalkyl and phenyl radicals.

2. 3-hydroxy-piperidines substituted on the ring nitrogen atoms by a group selected from the class consisting of alkyl, phenylalkyl and phenyl radicals.

3. 1-ethyl-3-hydroxy-piperidine.
4. 1-phenyl-3-hydroxy-piperidine.

RAYMOND PAUL.
GUSTAVE JEAN ROY.

REFERENCES CITED

The following references are of record in the file of this patent:

UNITED STATES PATENTS

| Number | Name | Date |
|---|---|---|
| 1,567,200 | Staudinger | Dec. 29, 1925 |
| 1,790,042 | Eisleb | Jan. 27, 1931 |
| 2,192,840 | Perlog | Mar. 5, 1941 |
| 2,265,201 | Schmidt et al. | Dec. 9, 1941 |
| 2,369,611 | Schenig et al. | Feb. 13, 1943 |
| 2,421,729 | Waltow et al. | June 3, 1947 |

FOREIGN PATENTS

| Number | Country | Date |
|---|---|---|
| 292,871 | Germany | June 29, 1916 |
| 563,759 | Germany | Jan. 23, 1933 |
| 571,227 | Germany | Apr. 7, 1933 |

OTHER REFERENCES

Granger, Ber. Deu. Chem., vol. 28, p. 1203 (1895).

Gunther, Ber. Deu. Chem., vol. 31, p. 2140 (1898).

Barsch et al., Chem. Abstracts, vol. 16, p. 1430 (1922).

Marvel et al., Jour. Am. Chem. Soc., vol. 51, p. 915 (1929).

Hahn et al., Ber. Deu. Chem., vol. 74, p. 1658 (1941).